(12) United States Patent
D'Souza (10) Patent No.: US 8,259,088 B1
(45) Date of Patent: Sep. 4, 2012

(54) TOUCH SENSOR AND TOUCH SYSTEM INCLUDING THE SAME

(75) Inventor: Henry D'Souza, San Diego, CA (US)

(73) Assignee: Elo Touch Solutions, Inc., Menlo Park, CA (US)

(*) Notice: Subject to any disclaimer, the term of this patent is extended or adjusted under 35 U.S.C. 154(b) by 7 days.

(21) Appl. No.: 13/038,543

(22) Filed: Mar. 2, 2011

(51) Int. Cl.
*G06F 3/042* (2006.01)

(52) U.S. Cl. .................................. 345/175; 178/18.09

(58) Field of Classification Search .............. 345/173, 345/174, 175, 176, 179, 180, 181, 182, 183; 178/18.01, 18.03, 18.09, 18.11, 19.01, 19.05, 178/19.06

See application file for complete search history.

(56) References Cited

U.S. PATENT DOCUMENTS

| 6,208,330 | B1 | 3/2001 | Hasegawa et al. |
| 6,236,391 | B1 | 5/2001 | Kent |
| 6,677,934 | B1 * | 1/2004 | Blanchard ................ 345/175 |
| 6,856,259 | B1 | 2/2005 | Sharp |
| 7,554,531 | B2 * | 6/2009 | Baker et al. ............... 345/173 |
| 2005/0174335 | A1 | 8/2005 | Kent et al. |

* cited by examiner

*Primary Examiner* — Abbas Abdulselam
(74) *Attorney, Agent, or Firm* — Alston & Bird LLP (57) ABSTRACT

A touch sensor for a touch system includes a housing having a light sensing window, a light blocking section, and a reference window, the light sensing window and the reference window configured to allow light to pass therethrough, the light blocking section configured to prohibit light from passing therethrough, a rotating assembly disposed within the housing, and a light sensor. The rotating assembly is configured to transmit light received from the light sensing window and the reference window to the light sensor, and the light sensor is configured to output a signal that is utilized to identify an angular location of a touch. A touch system including such touch sensors is also described herein.

20 Claims, 6 Drawing Sheets

TOUCH SENSOR AND TOUCH SYSTEM INCLUDING THE SAME

BACKGROUND OF THE INVENTION

Touch screen systems are available that use two or more camera assemblies that are located in different corners of the touch screen. Each of the camera assemblies includes one linear light sensor and simple optics such as a lens that detects light within a single field of view. One or more infrared light sources may be mounted in proximity to the lens or proximate other areas of the touch screen.

A touch screen system that uses one such camera assembly mounted in one corner of the touch screen and a second such camera assembly mounted in an adjacent corner of the touch screen provides reliable detection of a single touch on the touch screen using triangulation. The detection of the finger or stylus on the touch screen is made by detecting infrared light reflected by the stylus or finger, or by detecting a shadow of the stylus or finger due to the relative lack of light reflected from the bezel of the touch screen. However, some blind spots may occur near each of the camera assemblies where a location of a touch may not be determined.

Touch screen systems capable of detecting two or more simultaneous touches are desirable to increase the functionality for the user. At least one touch screen system therefore includes cameras located in other corners of the touch screen to sense the multiple touches. However, utilizing multiple cameras may increase the overall cost of the touch screen system. It is therefore desirable to provide a less costly device that may sense multiple touches on a touch screen.

BRIEF DESCRIPTION OF THE INVENTION

In accordance with an embodiment, a touch sensor includes a housing having a light sensing window, a light blocking section, and a reference window, the light sensing window and the reference window configured to allow light to pass therethrough, the light blocking section configured to prohibit light from passing therethrough, a rotating assembly disposed within the housing, and a light sensor; the rotating assembly configured to transmit light received from the light sensing window and the reference window to the light sensor, the light sensor configured to output a signal that is utilized to identify an angular location of a touch.

In accordance with another embodiment, a touch sensor includes a housing having a light sensing window configured to allow light to pass therethrough, and a light blocking section configured to prohibit light from passing therethrough, a rotating disc assembly disposed within the housing, and a light sensor; the rotating disc assembly configured to transmit light received from the light sensing window to the light sensor, the light sensor configured to output a signal that is utilized to identify an angular location of a touch.

In accordance with a further embodiment, a touch system includes a touch sensing plane, a light source configured to illuminate the touch sensing plane, and a touch sensor positioned proximate to the touch sensing plane. The touch sensor includes a housing having a light sensing window, a light blocking section, and a reference window, the light sensing window and the reference window configured to allow light to pass therethrough, the light blocking section configured to prohibit light from passing therethrough, a rotating assembly disposed within the housing, and a light sensor; the rotating assembly configured to transmit light received from the light sensing window and the reference window to the light sensor, and the light sensor configured to output a signal that is utilized to identify a location of a touch on the touch system.

DETAILED DESCRIPTION OF SPECIFIC EMBODIMENTS OF THE INVENTION

The foregoing summary, as well as the following detailed description of specific embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

Figure 1:
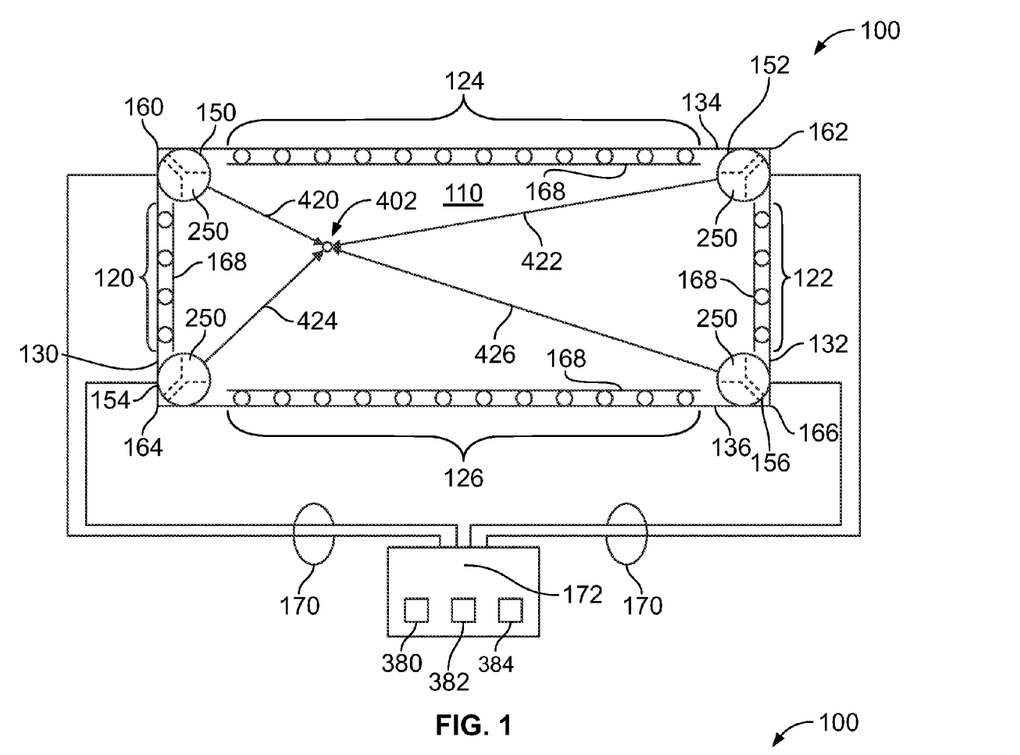
FIG. 1 illustrates a touch system formed in accordance with an embodiment of the present invention.
Figure 2:
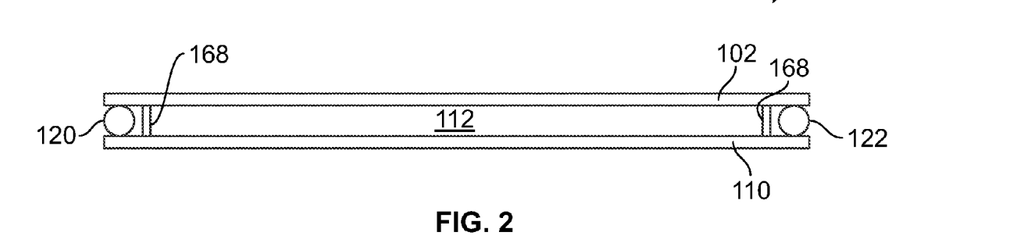
FIG. 2 illustrates a side cross-sectional view of the touch system shown in FIG. 1 formed in accordance with an embodiment of the present invention.

FIG. 1 illustrates a touch system 100 and FIG. 2 illustrates a side cross-sectional view of the touch system 100 shown in FIG. 1, according to a specific embodiment. The touch system 100 may have a touch surface 102 that may be a flexible sheet of glass, plastic, a flat panel display, a window or other transparent material that is placed in front of another display screen or objects of interest, and the like, according to specific embodiments. The touch surface 102, or other display behind the touch surface 102, may display a graphical user interface (GUI) having virtual buttons and icons or other graphical representations. Therefore, in some embodiments the touch surface 102 may be a display screen but is not so limited. In other embodiments, the touch surface 102 may be located physically separate from the displayed graphics, such as to function as a track or touch pad that translates the touches on the touch surface to a relative position on the display. Additionally, combinations of touches may be displayed e.g.

enabling an operator to use the touch surface 102 for writing text or drawings which may be displayed on the display, such that the combination of the touch surface and the display functions as a virtual whiteboard, for example.

Although the touch surface 102 is shown as rectangular in a specific embodiment, it should be understood that other shapes may be used. In still other embodiments, the touch surface 102 may be installed in front of a display to enable the touches to be displayed on the display, in real-time, as the touches occur. In yet other embodiments, the touch system 100 may be operated without the touch surface 102.

Accordingly, in the exemplary embodiment, the touch system 100 includes the touch surface 102 that may be optionally installed in front of a display 110 to define a touch sensing plane 112 therebetween. The touch sensing plane 112 may be an air-space illuminated by a plurality of light emitting diodes (LEDs). The term "light" or "optical", as used herein, is intended to mean infrared or near-infrared wavelength range, about 780-860 nanometer, so that visible light interference can be minimized by filtering/blocking. For example, the touch system 100 may include a first row of LEDs 120, a second row of LEDs 122, a third row of LEDs 124, and a fourth row of LEDs 126. The first row 120 is located along a vertical edge 130, the second row 122 is located along an opposite vertical edge 132, the third row 124 is located along a horizontal edge 134, and the fourth row 126 is located along an opposite horizontal edge 136. In operation, the rows of LEDs transmit a substantially horizontal plane of light through the touch sensing plane 112.

Referring to FIG. 2, specifically, a touch sensor 150 is mounted proximate one corner 160 of the touch surface 102 or the touch sensing plane 112. A second touch sensor 152 is mounted proximate another corner 162 of the touch surface 102 or the touch sensing plane 112. A third touch sensor 154 is mounted proximate another corner 164 of the touch surface 102 or the touch sensing plane 112. A fourth touch sensor 156 is mounted proximate another corner 166 of the touch surface 102 or the touch sensing plane 112. The touch system 100 may also include diffuser plates 168 mounted between the rows of LEDs 120 . . . 126 and the touch sensing plane 112. In operation, the diffuser plate 168 spreads out or scatters the light emitted from the rows of LEDs 120 . . . 126 such that the touch plane is illuminated with a substantially constant level of light.

In general, the touch sensors 150 . . . 156 detect the light emitted by the LEDs 120 . . . 126, that is diffused by plates 168, and transmit information, based on the received light, on a cable 170 to a touch screen controller 172. The touch screen controller 172 may provide some control signals and/or power to the touch sensors 150 . . . 156 and/or the LEDs 120 . . . 126. In another embodiment, the information detected by the touch sensors 150 . . . 156 is utilized by the touch screen controller 172 to identify the coordinates or one or more touches on the touch surface 102, or on the touch sensing plane 112 if the touch surface 102 is not utilized. The signals from the touch sensors 150 . . . 156 may also be transmitted to the touch screen controller 172 wirelessly.

Figure 3:
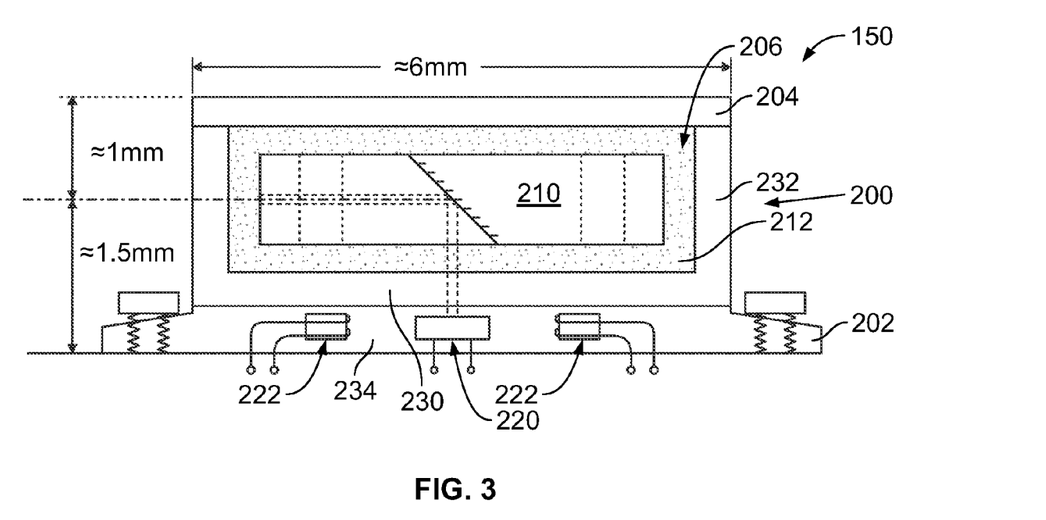
FIG. 3 illustrates a side cross-sectional view of a touch sensor that may be used with the touch system shown in FIGS. 1 and 2.

FIG. 3 is a side cross-sectional view of the touch sensor 150 according to a specific embodiment. It should be realized that although touch sensor 150 is described in more detail below, touch sensors 152, 154, and 156 are substantially similar to touch sensor 150. The touch sensor 150 includes a housing assembly 200 that includes a body 202 and a cover 204 that together define a cavity 206 therein. The cover 204 is preferably hermetically sealed to the body 202. The body 202 enables the touch sensor 150 to be secured to the display 110. For example, the touch sensor 150 may be secured to the display 110 via a plurality of fasteners and/or via an adhesive, as examples. In another embodiment, the touch sensor 150 may be secured to a frame (not shown) that forms a part of the touch system 100.

The touch sensor 150 also includes a rotating assembly, such as a rotating disc assembly 210, that is installed within the housing assembly 200. In the exemplary embodiment, the disc assembly 210 is surrounded by an optically transparent fluid 212, such as, for example, oil. The disc assembly 210 is encapsulated by the transparent fluid 212 and thus suspended within the cavity 206. Preferably, the transparent fluid 212 facilitates preventing the disc assembly 210 from contacting any of the interior surfaces of the housing assembly 200 during operation. The touch sensor 150 also includes a light sensor 220 and a set of at least two magnetic coils 222. The touch sensor 150 may include any type of sensor 220 capable of sensing light, e.g. a photosensor, a photodiode, etc. Light sensor 220 may be fixed within housing assembly 200 so as to remain stationary during operation. The operation of the touch sensor 150 is discussed in more detail below. It should be realized that although touch sensor 150 is described in more detail below, touch sensors 152, 154, and 156 are substantially similar to touch sensor 150.

Figure 4:
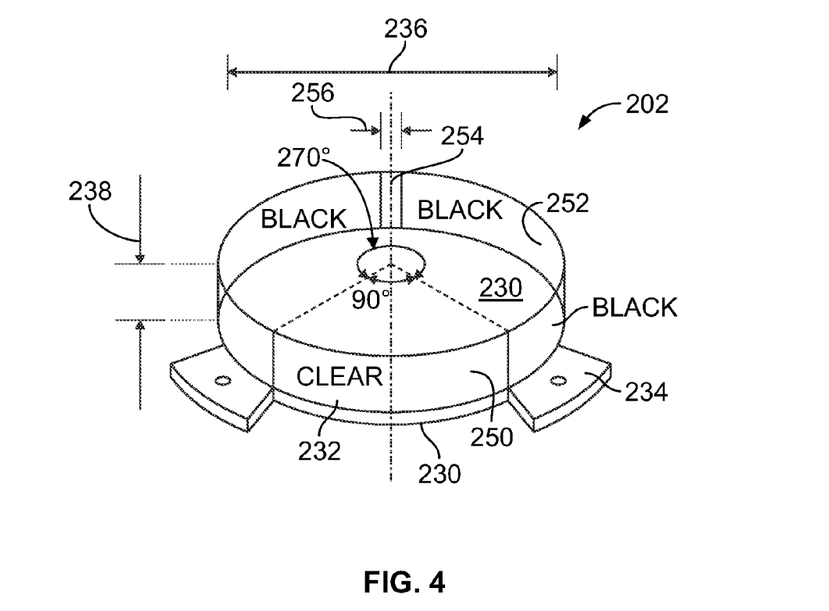
FIG. 4 illustrates a perspective view of a portion of the touch sensor shown in FIG. 3.

FIG. 4 is a perspective view of the body 202 shown in FIG. 3 according to a specific embodiment. The body 202 includes a bottom portion 230 and a sidewall 232 that is preferably formed unitarily with the bottom portion 230. Optionally, the sidewall 232 may be coupled to the bottom portion 230 using an adhesive, for example. The body 202 also includes a base 234 that is utilized to secure the touch sensor 150 in a fixed location as discussed above. The base 234 may be embodied as a plurality of mounting tabs as shown in FIG. 4. Optionally, the base 234 may be embodied as any type of structural element that enables the touch sensor 150 to be secured. The bottom portion 230 has a generally circular profile and base 234 in the form of mounting tabs or flanges may be provided integrally, according to a specific embodiment. Thus, when the sidewall 232 is coupled to the bottom portion 230, the cavity formed, e.g. the cavity 206, is shaped as a hollow cylinder. The body 202 has a diameter 236 and a height 238. The diameter 236 and the height 238 are selected based on the size of the disc assembly 210. For example, assuming that the disc assembly 210 has a diameter D and a thickness T, the cavity 206 formed by the bottom portion 230 and the sidewall 232 will have a diameter 236>D and a height 238>T to enable the disc assembly 210 to be suspended within the cavity 206 without contacting either the bottom portion 230, the sidewall 232, or the cover 204.

The sidewall 232, which is ring-shaped in a specific embodiment, may be divided into three arcuate sections, referred to herein as a light sensing window 250, a light blocking section 252, and a reference window 254. The light sensing window 250 and the reference window 254 are substantially transparent to the desired light. The light blocking section 252 is substantially opaque to prohibit the light from passing therethrough. In one embodiment, the light sensing window 250 spans approximately 90 degrees and the light blocking section 252 spans approximately 270 degrees such that the total length or circumference of the sidewall spans 360 degrees. The light sensing window 250 is substantially clear such that light emitted from the LEDs 120 . . . 126 may pass through the light sensing window 250 and be detected through the disc assembly 210 and body 202 by the light sensor 220, as is discussed in more detail below. In contrast, the light blocking section 252 substantially blocks light emitted from the LEDs 120 . . . 126 from being detected by the disc assembly 210 and light sensor 220. As shown in FIG. 4, the sidewall 232 also has a reference window 254 that is located approximately at the midpoint of the light blocking section 252. In the exemplary embodiment, the reference window 254 has a width 256 that spans less than one degree, and in other embodiments the width 256 the reference window 254 may span between approximately one degree and approximately two degrees. In the exemplary embodiment, the width 256 of the reference window 254 is sized to be sufficient to enable light to be transmitted through the reference window 254 and detected by the disc assembly 210. Thus, the width 256 may be relatively small. In the exemplary embodiment, the reference window 254 is located such that a line 260 passing through a center of the reference window 254 also passes through a center of the light sensing window 250. Thus, the center of the reference window 254 is approximately 180 degrees from the center of the light sensing window 250.

According to specific embodiments, the body 202 and cover 204 of the touch sensor 150 may be fabricated from a metallic material, a plastic material, or any other material suitable to enable light to be transmitted through the light sensing window 250 and the reference window 254 and blocked by the light blocking section 252. For example, in one embodiment, the body 202 and the cover 204 may be fabricated from a clear or translucent material. Certain interior or exterior portions of the body 202 and the cover 204 may then be coated with an opaque material that prohibits undesired light from being transmitted through the selected portions and received by the disc assembly 210 and light sensor 220, provided that desired light is able to be transmitted (through the light sensing window 250, disk assembly 210, through a light transparent portion of body 202 above light sensor 220) to light sensor 220. In the exemplary embodiment, the only portions of the body 202 and the cover 204 that are not coated with an opaque coating are the light sensing window 250, the reference window 254 and portion above light sensor 220.

Accordingly, in operation, only light transmitted through the light sensing window 250 and the reference window 254 is received by the disc assembly 210 and light sensor 220. All other portions of the body 202 and cover 204 are coated to block light from entering the cavity 206. In another embodiment, the body 202 and the cover 204 may be fabricated from plastic materials having different colors. For example, the selected interior or exterior portions of the body 202 and the cover 204 may be formed using an opaque plastic material that substantially prohibits light from being transmitted through the selected portions and received by the disc assembly 210. The light sensing window 250 and the reference window 254 may be fabricated from a clear or transparent plastic that enables light to be transmitted through the body 202 and received by the disc assembly 210. In all embodiments, the sensor 150 is configured such that light is allowed to be transmitted only through the light sensing window 250 and the reference window 254.

It should be recognized that the exemplary embodiment provides a disk shaped touch sensor with correspondingly disk shaped body, but in other embodiments the body and sidewall may be differently shaped (e.g., having at least one flat side) provided magnet and coils are able to keep disk assembly 210 in place within the fluid contained in the body of the touch sensor.

Figure 5:
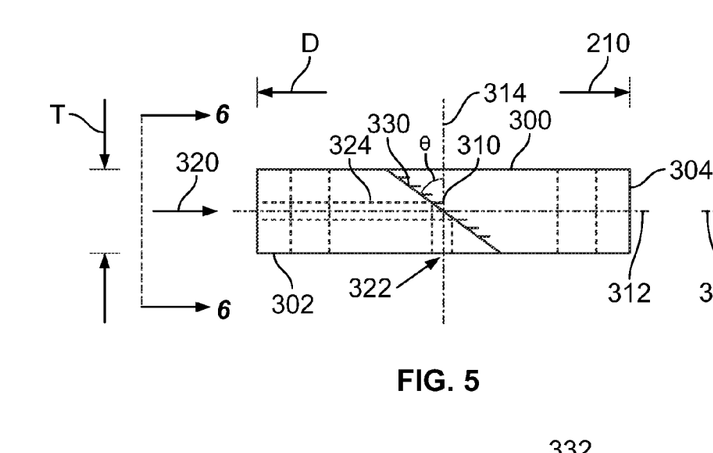
FIG. 5 illustrates a side cross-sectional view of a portion of the touch sensor shown in FIG. 3.
Figure 6:
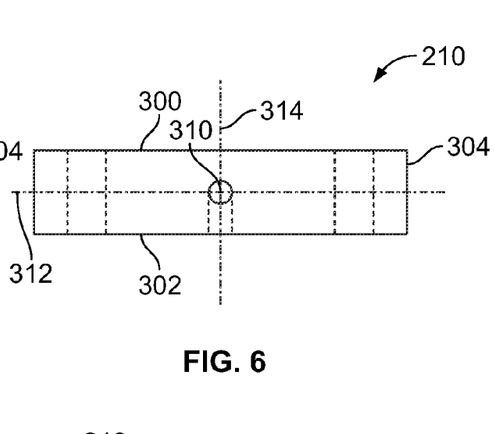
FIG. 6 illustrates another side cross-sectional view of the portion of the touch sensor shown in FIG. 5.
Figure 7:
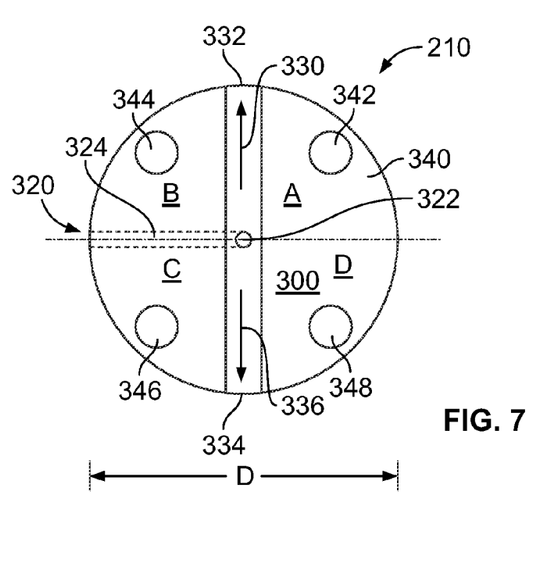
FIG. 7 illustrates a top view of the portion of the touch sensor shown in FIGS. 5 and 6.

FIG. 5 illustrates a side cross-sectional view of the disc assembly shown 210 in FIG. 3. FIG. 6 illustrates another side cross-sectional view of the disc assembly 210 shown in FIG. 5. FIG. 7 illustrates a top view of the disc assembly 210 shown in FIGS. 5 and 6. In the exemplary embodiment, the disc assembly 210 is embodied as a substantially flat circular plate that is defined by an upper surface 300 and an opposing lower surface 302 that is substantially parallel to the upper surface 300. The disc assembly 210 also includes a sidewall 304 that extends between the upper surface 300 and the lower surface 302. As discussed above, the disc assembly 210 has a diameter D that is less than the diameter 236 of the cavity 206. The disc assembly 210 also has a thickness T that is less than the height 238 of the cavity 206. The diameter D and thickness T of the disc assembly 210 are selected to enable the disc assembly 210 to be suspended within the cavity 206 without contacting either the bottom portion 230, the sidewall 232, or the cover 204.

The disc assembly 210 is defined using a pair of axes that are disposed with respect to a centerpoint 310 within the disc assembly 210. The centerpoint 310 may be envisioned as an imaginary reference point that is located midway between an upper surface 300 and a lower surface 302 and is also located at the origin of the circle that forms the sidewall 304. Accordingly, an X-axis 312 is located midway between the upper surface 300 and the lower surface 302 and extends horizontally through the centerpoint 310. A Y-axis 314 is disposed perpendicular to the X-axis 312 and also extends through the centerpoint 310. Accordingly, the X-axis 312 intersects the Y-axis 314 at the centerpoint 310.

The disc assembly 210 includes a first optical opening 320 through the sidewall 304, along the X-axis 312, to the centerpoint 310. The disc assembly 210 also includes a second optical opening 322 that extends from the centerpoint 310, along the Y-axis 314, and through the lower surface 302. In the exemplary embodiment, the first opening 320 is substantially perpendicular to the second opening 322 and also intersects the second opening 322 at the centerpoint 310. The combination of the first opening 320 and the second opening 322 form a single continuous L-shaped "light pipe" or optical opening 324 that extends through the sidewall 304, along the X-axis 312, to a vertex area approximately at the centerpoint 310, and then extends along the Y-axis 314, through the lower surface 302. The first and second openings 320 and 322, and thus the L-shaped opening 324 may be formed by milling or machining the openings into the disc assembly 210.

The disc assembly 210 also includes a mirror 330 that extends from a first point 332 on the sidewall 304 to a second point 334 on the sidewall 304. Accordingly, the mirror 330 is provided minimally at the vertex area of L-shaped opening 324 and has a length 336 that may in some embodiments be approximately equal to the diameter D of the disc assembly 210. As shown in FIG. 5, the mirror 330 is offset from the Y-axis 314 by a predetermined angle θ. In the exemplary embodiment, the angle θ is approximately 45 degrees, and the mirror 330 is disposed at an angle of (90 degrees−θ) with respect to the first opening 320, such that light transmitted through the first opening 320 is reflected about 90 degrees by the mirror 330 and transmitted through the second opening 322 to light sensor 220.

The disc assembly 210 also includes a plurality of magnets 340 such as, for example, three to six or more magnets according to specific embodiments. The number of magnets 340, number of coils 222, and their respective placements are selected such that the disc assembly 210 is controllably rotated within the fluid in body 202. In an exemplary embodiment, the disc assembly includes four magnets 342, 344, 346, and 348. Each magnet 342 . . . 348 preferably extends from the upper surface 300 to the lower surface 302 in a specific embodiment. Accordingly, each magnet 342 . . . 348 has a length that is approximately equal to the thickness T of the disc assembly 210. In the exemplary embodiment, the magnets 340 are arranged such that a single magnet is located at a midpoint in each quadrant defined by the X-axis 312 and the Y-axis 314. For example, the magnet 342 is located in a quadrant A, the magnet 344 is located in a quadrant B, the magnet 346 is located in a quadrant C, and the magnet 348 is located in a quadrant D. The operation of the magnets 340 are discussed in more detail below.

Figure 8:
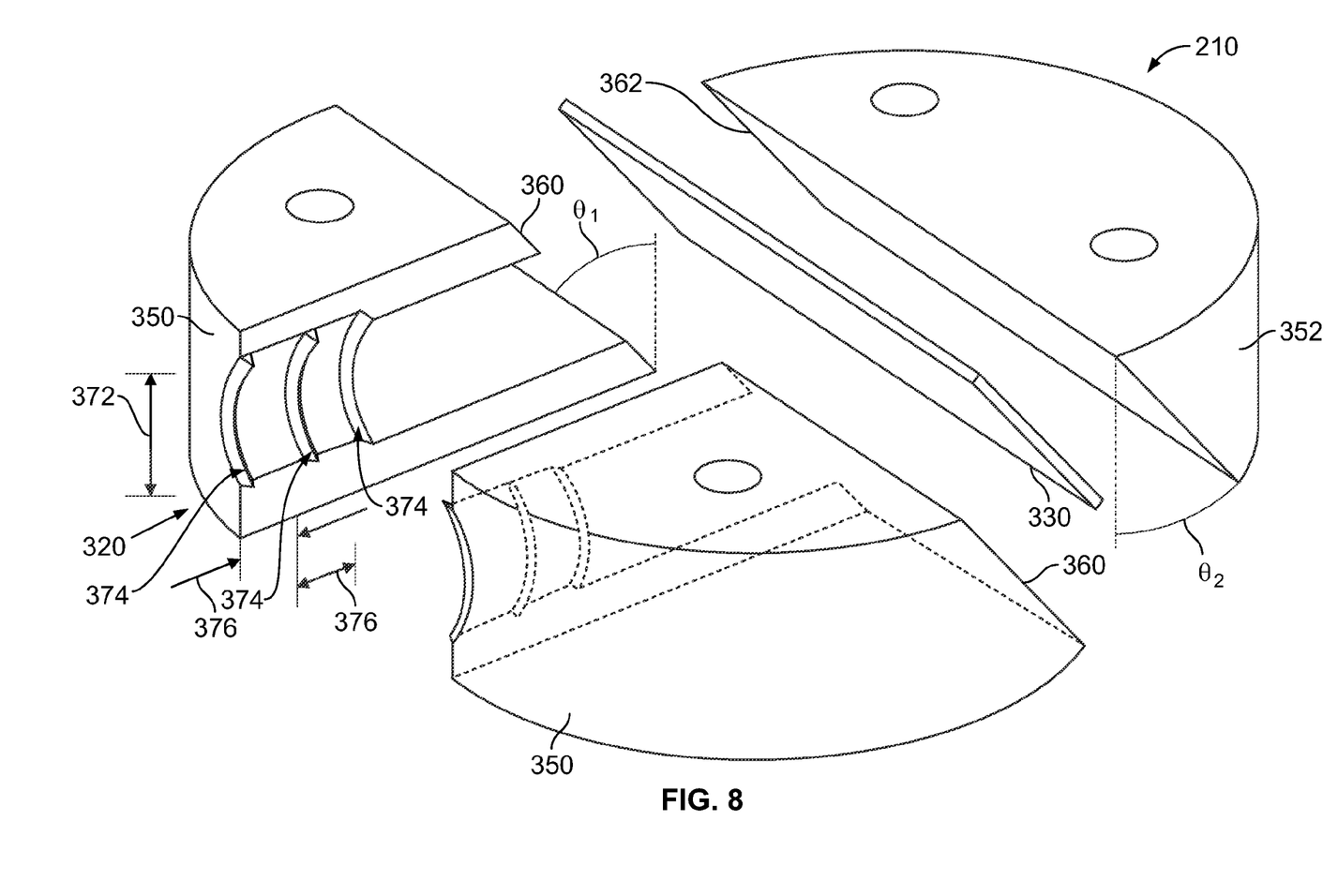
FIG. 8 illustrates an exploded perspective view of the touch sensor shown in FIG. 3 formed in accordance with an embodiment of the present invention.

FIG. 8 illustrates an exploded perspective view of the disc assembly 210 shown in FIGS. 4-7 according to a specific embodiment. The disc assembly 210 may include a plurality of disc portions that are coupled together, using an adhesive for example, to form the disc assembly 210. The disc portion include a first disc portion 350, a second disc portion 352 and the mirror 330 that is disposed between the first and second disc portions 350 and 352. It should be realized that, although the first disc portion 350 is illustrated as two separate portions, the first disc portion 350 is formed preferably as a single unitary portion and the two separate portions are shown to illustrate and describe various aspects of the opening 320 extending through the first disc portion 350. It also should be recognized that, although mirror 330 is shown as extending through the entire diameter of the disc assembly (e.g., a full diameter mirror may be used for ease of manufacturability) in FIGS. 7-8, in other embodiments the mirror 330 may not extend across the entire diameter but have a length sufficient to at least abut to the appropriate portion or vertex area of light pipe 324.

In the exemplary embodiment, the first disc portion 350 has an endwall 360 that is disposed at an angle $\theta_1$, which is equal to angle $\theta$, and the second disc portion 352 has an endwall 362 that is disposed at an angle $\theta_2$, wherein $\theta$ is complementary to $\theta_2$. The first opening 320 and/or opening 322 in a preferred embodiment has an oval, or elongated, cross-sectional profile. Specifically, the first opening 320 has a width 370 and a height 372 wherein the width 370 is less than the height 372. The elongated opening 320 enables light that is substantially aligned with the axis of the first opening 320 to enter the opening 320 and restricts or blocks light entering being received from other angles from entering the opening 320. In other embodiments, opening 320 and/or opening 322 may have differently shaped cross-sectional profiles, such as circular, rectangular, square, polygonal or other irregular profile.

A plurality of optical baffles 374 are arranged within the first opening 320. The optical baffles 374 are each separated by a distance 376. In operation, the optical baffles 374 enable only the rays of interest (e.g., the rays that are substantially parallel to the opening 320) from reaching the light sensor 220 through the opening 320. The baffles 374 therefore substantially block any light rays that are not substantially parallel to the opening 320 from entering the opening 320. For example, any light rays coming into the first opening 320 at an angle of 90 degrees with respect to the centerline axis of the first opening 320, are deflected back out of the opening 320. In general, the baffles 374 are configured and located to enable only light rays having a predetermined angle with respect to the opening 320 to enter the opening 320 and thus reach light sensor 220. Light rays having an incident angle that is greater than the predetermined angle are deflected back out of the opening 320 via the baffles 374. Thus, the baffles 374 function to increase the optical efficiency of the touch sensor 150.

The operation of the touch sensor 150 will now be explained with reference to FIG. 3. As discussed above, the touch sensor 150 includes a plurality of magnets 340 that are embedded in the disc assembly 210. In operation, the magnetic coils 222 are energized in such a manner as to generate a magnetic field proximate to the magnets 340 and cause the disc assembly 210 to rotate similar to a brushless DC motor, as the magnets 340 are embedded in the disc assembly 210. Moreover, because the disc assembly 210 is floating in the optically transparent fluid 212 within the housing assembly, relatively little power is required to cause the disc assembly to rotate. The magnetic coils may be configured to rotate the disc assembly in either a clock-wise direction or a counter-clockwise direction. In the exemplary embodiment, each of the touch sensors 150 . . . 156 may be configured to rotate in the same direction. The operation of magnets 340 within touch sensor 150 of a touch system may be controlled by touch controller 172 of the touch system according to a specific embodiment, and/or each touch sensor 150 may have embedded in its housing assembly some control logic that may be coordinated by a central processor of a computer that is used with touch system 100.

Figure 9:
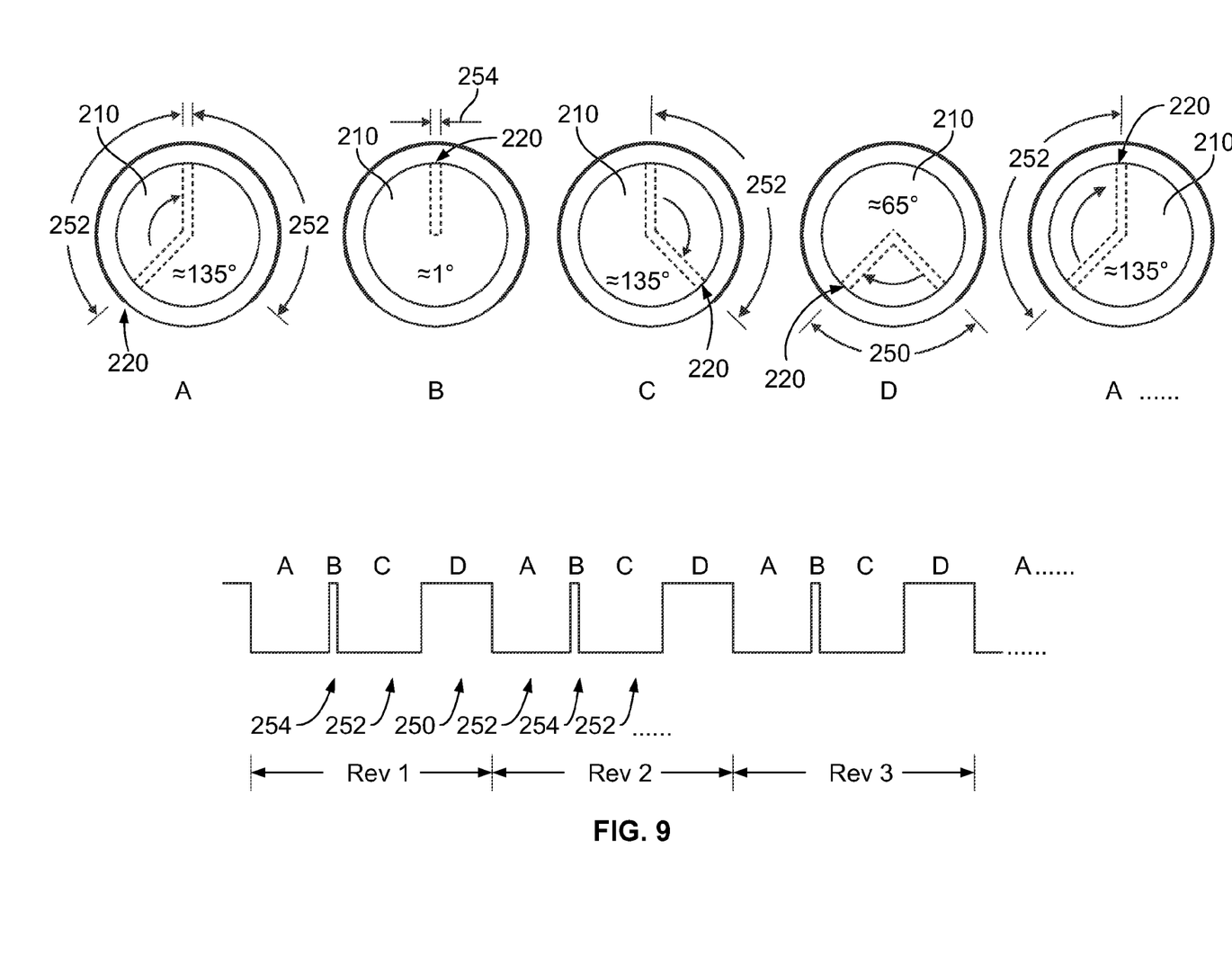
FIG. 9 illustrates an exemplary signal output by the touch sensor shown in FIG. 3 formed in accordance with an embodiment of the present invention.

As the disc assembly rotates, light generated by the LEDs 120 . . . 126 is transmitted through the opening 324 (as reflected by mirror 330) and is detected by the light sensor 220. The light sensor 220 then generates a signal that is indicative of the light detected by the light sensor 220. For example, FIG. 9 illustrates an exemplary baseline touch profile 400, also referred to herein as a baseline touch profile, generated by the light sensor 220 when a touch is not detected by the touch sensor 220 and the touch screen controller 172. As discussed above, the light sensor 150 includes the light sensing window 250 and the reference window 254 which both enable light to be transmitted into the cavity 206 and thus be transmitted by the disc assembly 210, via the L-shaped opening 324, to the light sensor 220. The remaining sections of the touch sensor 150 are opaque to prohibit light from entering the cavity 206. Moreover, the light blocking section 252 of the sidewall spans approximately 270 degrees with the reference window 254 being disposed midway between the light blocking section 252, and the light sensing window 250 spans approximately 90 degrees.

Thus, as shown in FIG. 9, as the disc assembly 210 rotates, the first opening 320 of the disc assembly 210 passes by the first portion of the light blocking section 252, light is blocked from entering the cavity 206 and being received by the disc assembly 210. Thus, while the first opening 320 is in the region of the light blocking section 252, denoted as "A" in FIG. 9, the baseline touch profile 400 is "off" or "low" denoted as "A" in FIG. 9. As the first opening 320 passes by the reference window 254, light from the LEDs 120 . . . 126 is enabled to pass through the reference window 254, through the L-shaped opening 324, and be received by the light sensor 220. Thus, while the first opening 320 is in the region of the reference window 254, denoted as "B" in FIG. 9, the baseline touch profile 400 is "on" or "high" denoted as "B" in FIG. 9. As the disc assembly 210 continues to rotate, the first opening 320 passes by the second portion of the light blocking section 252 which again blocks light from entering the cavity 206 and being received by the disc assembly 210. Thus, while the first opening 320 is in the region of the light blocking section 252, denoted as "C" in FIG. 9, the baseline touch profile 400 is "off" or "low". The disc assembly 210 continues to rotate, and passes by the light sensing window 250 wherein the first opening 320 of the disc assembly 210 passes the light blocking window 252 generating an "on" or "high" signal denoted as "D" in FIG. 9. Specifically, as the first opening 320 passes by the light sensing window 250, light from the LEDs 120 . . . 126 is enabled to pass through the light sensing window 250, through the L-shaped opening 324, and be received by the light sensor 220.

In the exemplary embodiment, the baseline touch profile 400 is utilized by the touch screen controller 172 to determine the location of at least one touch on the touch surface 102. More specifically, as discussed above, the light sensing window 250 spans approximately 90 degrees, the light blocking section 252 spans approximately 270 degrees, and the reference window 254 spans approximately 1 degrees. Thus, when the disc assembly 210 is rotated at a substantially constant speed, the first opening 320 will be exposed to light for different lengths of time based on the location of the first opening 320 with respect to the light sensing window 250, the light blocking section 252, and the reference window 254. For example, as shown in FIG. 9, the length of time utilized by the disc assembly 210 to span the light blocking section 252, which includes two portions each spanning approximately 135 degrees, is greater than a length of time utilized by the disc assembly 210 to span the light sensing window 250 which spans approximately 90 degrees, which is also greater than the length of time utilized by the disc assembly 210 to span the reference window 254 which spans approximately 1 degree. Accordingly, the baseline touch profile 400 may be utilized by the touch sensor controller 172 to identify a location of a touch on the touch system 100 as is discussed in more detail below. It should be realized that although FIG. 9 is utilized to describe the operation and resultant signal generated by the touch sensor 150, that each of the touch sensors 152, 154, and 156 operate similarly to touch sensor 150 and also output a respective signal that is similar to the baseline touch profile 400 shown in FIG. 9.

The operation of the touch system 100 will now be explained. Referring again to FIG. 1, as discussed above, the touch sensors 150 . . . 156 are each located near a respective corner of the touch system 100, according to a specific embodiment. Accordingly, the location of each touch sensors 150 . . . 156 is known. Moreover, each touch sensor 150 . . . 156 is positioned such that the light sensing window 250 is directed towards the touch sensing plane 112 and the reference window 254 is facing a respective corner. For example, the reference window 254 of the touch sensor 150 faces the corner 160, etc.

In one embodiment, when no touch is occurring on the touch surface 102, each of the touch sensors 150 . . . 156 continually generates a signal similar to the baseline touch profile 400 shown in FIG. 9. In embodiments where a touch surface 102 is also provided, when a user touches the touch surface 102, the touch surface may deflect inwardly into the touch sensing plane 112 toward the display 110 and the finger/stylus blocks the LED illumination in plane 112 from reaching the touch sensors 150 . . . 156. More specifically, as discussed above, along the perimeter of the touch system 100 is a plurality of LEDs that generate a substantially constant level of light. When an operator is not touching the touch surface 102, as the disc assembly 210 spins, the light sensor 220 detects this substantially constant level of light. However, when the operator touches the touch surface 102 at a point, denoted as 402, for example, the touch blocks a portion of the light, causing a reduction or dip in the intensity of the light entering the touch sensors 150 . . . 156, compared to the intensity of light entering the touch sensors 150 . . . 156, when the light is not blocked. This dip or drop in intensity is identified by the touch sensors 150 . . . 156. The signals generated by each respective touch sensor 150 . . . 156 may be input to the touch screen controller 172. In the exemplary embodiment, the signals output from each touch sensors 150 . . . 156 are analog signals and the touch screen controller includes an analog-to-digital converter (ADC) 380 to convert the analog signals to digital signals which are then utilized by a processor 382, and a counter 384, (each shown in FIG. 1) to determine a location of at least one touch on the touch surface 102, as is discussed in more detail below.

Figure 10:
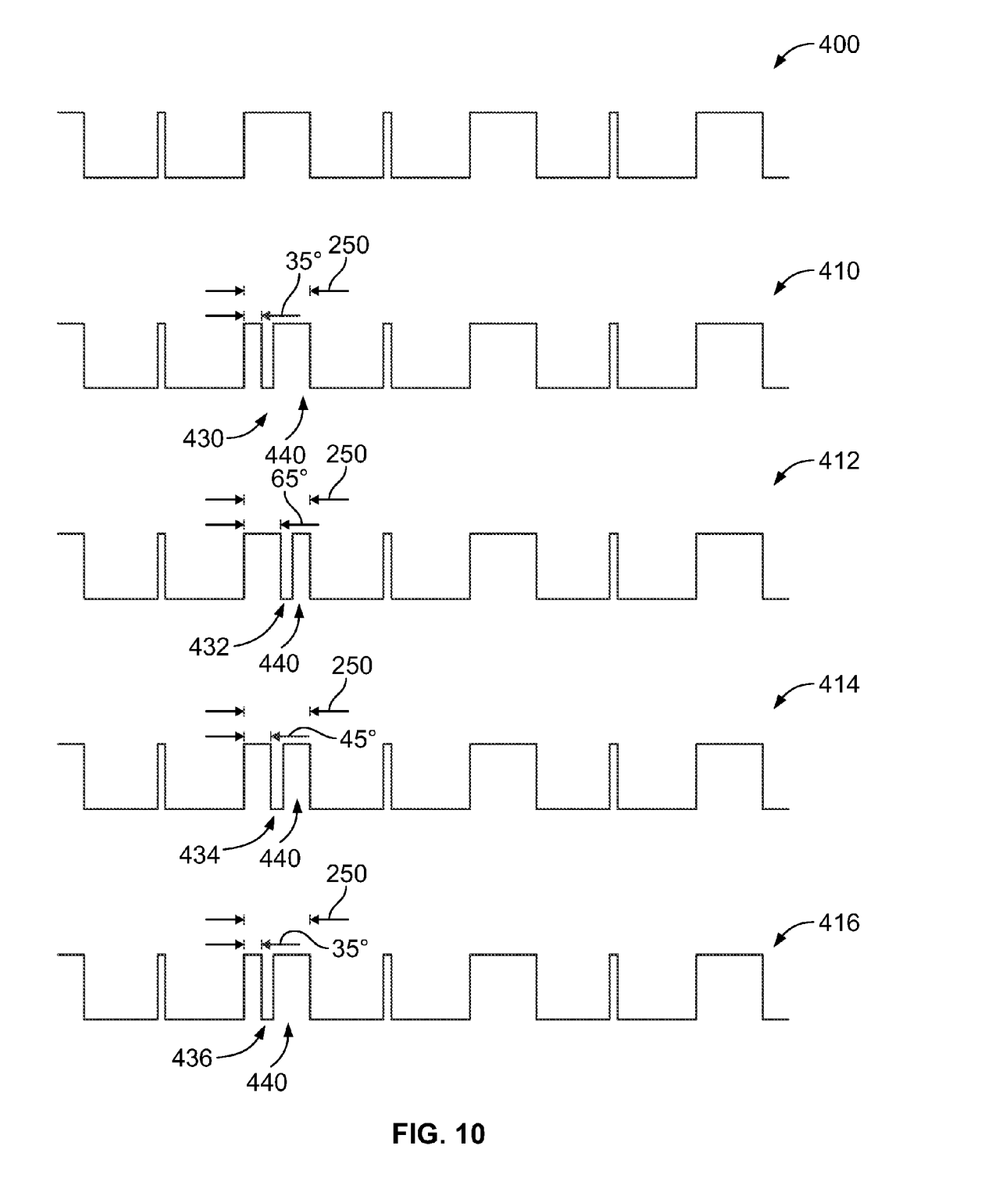
FIG. 10 illustrates a plurality of exemplary signals output by the touch sensors shown in FIG. 1 in accordance with an embodiment of the present invention.

FIG. 10 illustrates an exemplary signal that may be generated by each respective touch sensor when a touch is detected and compared to baseline signal 400. For example, a signal 410 may be generated by the touch sensor 150, a signal 412 may be generated by the touch sensor 152, a signal 414 may be generated by the touch sensor 154, and a signal 416 may be generated by the touch sensor 156. As shown in FIG. 10, when a touch is detected, the light sensing window 250 for each respective touch sensor experiences a drop or "low" in the normally "high" portion of the baseline signal profile for that touch sensor. The location of the dip or drop corresponds to an angular position along the angular span of the light sensing window 250. The combination of angular position detected for the touch by each touch sensor is associated by the controller with a particular location of the touch, such as by using triangulation methods.

For example, as shown in FIG. 1, and represented graphically in FIG. 10, the angular location of the touch 402 sensed by the touch sensor 150 occurs at a point approximately 35 degrees after the disc assembly 210 enters the light sensing window 250. This angular location is illustrated as a vector 420 in FIG. 1. The angular location of the touch 402 sensed by the touch sensor 152 occurs at a point approximately 65 degrees after the disc assembly 210 enters the light sensing window 250. This angular location is illustrated as a vector 422 in FIG. 1. The angular location of the touch 402 sensed by the touch sensor 154 occurs at a point approximately 45 degrees after the disc assembly 210 enters the light sensing window 250. This angular location is illustrated as a vector 424 in FIG. 1. Additionally, the angular location of the touch 402 sensed by the touch sensor 156 occurs at a point approximately 45 degrees after the disc assembly 210 enters the light sensing window 250. This angular location is illustrated as a vector 426 in FIG. 1. Therefore, because the location of each touch sensor 150 . . . 156 is known, the touch sensors 150 . . . 156 are enabled to utilize the reference window 254 to generate a reference angle that indicates when the light sensing window 250 is currently subjected to light from the LED's. The touch sensors 150 . . . 156 therefore respectively identify a specific angle at which a touch occurred with respect to each touch sensor. The controller is able to determine touch coordinates for the touch based on the specific combination of angular positions detected by the touch sensors, as discussed further below.

More specifically, as the disc assembly 210 transitions from the light sensing window 250 into the light blocking section 252, the light sensor 220 indicates "low" or zero. As the disc assembly 210 transitions into the light blocking section 252, the light sensor 220 "sees" the reference window 254 for a brief instant. At this instant, the ADC 380 sees a signal strength of approximately 255 which is approximately equal to the light level of the backlit touch screen when a touch is not occurring. Concurrently with the disc assembly 210 transitioning into the reference window 254, the counter 384 is reset or zeroed out and begins incrementing at a predetermined rate. The counter 384 then counts, or increments at a fixed rate to determine the time when the disc assembly 210 transitions back into the light blocking section 252. At a certain point, the disc assembly 210 transitions back into the light sensing window 250. At the approximate point where the disc assembly 210 transitions from the light blocking section 252 to the light sensing window 250, the counter "marks" or identifies this point which provides a certain value which corresponds to the actual time when the disc assembly 210 entered the light sensing window 250. The counter 384 continues to count as the disc assembly 210 transitions through the light sensing window 250. If there is no touch, the counter 384 will then utilize the signal received from the touch sensor to identify when the disc assembly 210 has again transitioned into the light blocking section 252. At the approximate point where the disc assembly 210 transitions from the light sensing window 250 to the light blocking section 252, the counter "marks" or identifies this point which provides an indication of the approximate point in time the transition occurred. The marks identifying when the disc assembly 210 transitions into and out of the light sensing window 250 provide the location of the 90 degree segment that forms the light sensing window 250.

If the disc assembly 210 is rotating, for example, 900 times per second, the disc assembly 210 will transition past the reference window 254 900 times, causing the counter 384 to reset and begin counting 900 times. Therefore, because the light sensing window 250 is known to span 90 degrees, the touch screen controller 172 may utilize the information from the reference window 254 to determine the rpm of the spinning disc assembly 210. Additionally, if an operator touches the touch surface 102, between the initial transition into the light sensing window 250 and the transition out of the light sensing window 250, the signals output from the touch sensors 150 . . . 156 will indicate a small degradation in the strength of the signal (shown as the points 430 . . . 436 in FIG. 10, which correspond to the vectors 420 . . . 426 shown in FIG. 1) compared to the strength of the signal output (shown as points 440 in FIG. 10) when a person is not touching the touch surface 102. The touch screen controller 172 utilizes these points 430 and 432 to determine a location of the touch on the touch surface 102.

In the exemplary embodiment, the points 430 . . . 436 and/or the vectors 420 . . . 426 are utilized by the touch screen controller 172 to determine the location of at least one touch. More specifically, at least some of the vectors 420 . . . 426 are triangulated to determine the location of the touch 402. For example, the location where one vector, e.g. vector 420 crosses or intersects a second vector, e.g. the vector 422, may be utilized to determine the location of the touch 402. It should be realized that only two vectors may be utilized to determine the location of a single touch according to a specific embodiment. Accordingly, only two touch sensors are required to determine the location of a single touch. However, the vectors generated by three or more touch sensors may be utilized to detect multiple touches that occur approximately concurrently on the touch surface 102 according to other specific embodiments. For example, when two or more fingers contact the touch surface 102, each of the touch sensors 150 . . . 156 "see" the multiple touches from different angles. Thus, two resultant vectors will intersect at a first point representing a first touch and two other vectors will intersect at a different point that represents the second touch.

In operation, the touch screen controller 172 may periodically update the baseline touch profile 400 when no touch is present. The touch system controller 172 may periodically update the baseline touch profile 400 based on ambient light, such as to take into account changes in sunlight, room lighting, and the change in lighting produced by the LEDs.

In one embodiment, if one touch or more is present, a decrease in light on at least one area of the sensors 150 . . . 156 may be detected. In another embodiment, the presence of one or more touches may be indicated by an increase in light on at least one area of the touch sensors 150 . . . 156. In one embodiment, the touch screen controller 172 may also identify the associated coordinates of any detected touch. Information with respect to how fast the touch is moving across the touch surface 102 may also be determined. In some embodiments, the processing of the signals to identify presence and coordinates of one or more touches may be accomplished in hardware, software and/or firmware that is not within the touch screen controller 172.

As used herein, "simultaneous touches" refers to two or more touches that are present within the touch sensing plane 112 (and/or in contact with the touch surface 102 when provided) during a same time duration but are not necessarily synchronized. Therefore, one touch may have a duration that starts before the beginning of the duration of another touch, such as a second touch, and at least portions of the durations of the first and second touches overlap each other in time. For example, two or more simultaneous touches occur when objects such as a finger or stylus are present within touch sensing plane 112 (and/or makes contact with the touch surface 102 if provided) in two or more distinct locations over a same time duration. Similarly, two or more simultaneous touches may occur when objects are within a predetermined distance of, but not in contact with, the touch surface 102 (if provided) in two or more distinct locations over a same time duration.

When one or more touches are identified, the touch surface controller 172 (or other host computer controller) may then pass the (X,Y) coordinates (or (X,Y,Z) coordinates) to the display 110 that may be stored within one or more modules of firmware or software. The display 110 may be a graphical user interface (GUI) module. In one embodiment, the display module 110 is run by a host computer (not shown) that also runs an application code of interest to the user. The display 110 determines whether the coordinates indicate a selection of a button or icon displayed on the touch surface 102. If a button is selected, the host computer or other component(s) (not shown) may take further action based on the functionality associated with the particular button. The display 110 may also determine whether one or more touch is associated with a gesture, such as zoom or rotate. The one or more touch may also be used to replace mouse and/or other cursor input. To detect an increased number of simultaneous touches and/or to decrease potential blind spots formed by touches, one or more additional touch sensors (not shown) may be utilized.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. For example, in embodiments where four touch sensors are provided at corners of the touch system, the light sensing window 250 of a touch sensor has a 90 degree span, but in other embodiments where a different number of touch sensors are used and/or in different locations (not necessarily each corner, such as might be the case for a customized application) the light sensing window 250 of each touch sensor may vary depending on that touch sensor's location with respect to the touch detection area of the touch system.

This written description uses examples to disclose the invention, including the best mode, and also to enable any person skilled in the art to practice the invention, including making and using any devices or systems and performing any incorporated methods. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A touch sensor for a touch system, said touch sensor comprising:
    a housing having a light sensing window, a light blocking section, and a reference window, the light sensing window and the reference window configured to allow light to pass therethrough, the light blocking section configured to prohibit light from passing therethrough;
    a rotating assembly disposed within the housing; and
    a light sensor;
    wherein the rotating assembly is configured to transmit light received from the light sensing window and the reference window to the light sensor, and the light sensor is configured to output a signal that is utilized to identify an angular location of a touch.

2. The touch sensor of claim 1, further comprising:
    at least one magnet disposed on the rotating assembly; and
    at least one magnetic coil, the at least one magnetic coil configured to generate a magnetic field that causes the rotating assembly to rotate within the housing.

3. The touch sensor of claim 2, further comprising a fluid disposed within the housing, the fluid enabling the rotating assembly to be suspended within the housing.

4. The touch sensor of claim 1, wherein the reference window generates a signal indicating an angular position of the rotating assembly.

5. The touch sensor of claim 1, further comprising an optical opening formed within the rotating assembly, the optical opening configured to transmit light transmitted through the light sensing window and the reference window to the light sensor.

6. The touch sensor of claim 1, wherein the rotating assembly comprises a disc having an L-shaped optical opening formed therethrough, the L-shaped optical opening configured to transmit light received from the light sensing window and the reference window to the light sensor.

7. The touch sensor of claim 6, wherein in the rotating assembly comprises a first disc portion, a second disc portion, and a mirror, said mirror disposed between the first and second disc portions and provided at a vertex area of the L-shaped optical opening.

8. The touch sensor of claim 1, wherein the rotating assembly comprises an L-shaped optical opening formed therethrough, the L-shaped optical opening having a first optical opening portion that enables light to be transmitted from the light sensing window and the reference window to a mirror, the mirror reflecting the light through a second optical opening portion to the light sensor.

9. The touch sensor of claim 1, wherein the light blocking section has a first angular span, the light sensing window has a second angular span that is less than the first angular span, and the reference window has a third angular span that is less than the first and second angular spans.

10. A touch sensor for a touch system, said touch sensor comprising:
    a housing having a light sensing window configured to allow light to pass therethrough, and a light blocking section configured to prohibit light from passing therethrough;
    a rotating disc assembly disposed within the housing; and
    a light sensor;
    wherein the rotating disc assembly is configured to transmit light received from the light sensing window to the light sensor, and the light sensor is configured to output a signal that is utilized to identify an angular location of a touch.

11. The touch sensor of claim 10, the housing further comprising a reference window that generates a signal indicating an angular position of the rotating disc assembly.

12. The touch sensor of claim 10, further comprising a fluid disposed within the housing, the fluid enabling the rotating disc assembly to be suspended within the housing.

13. The touch sensor of claim 12, further comprising:
    at least one magnet disposed on a disc element of the rotating disc assembly; and
    at least one magnetic coil, the at least one magnetic coil configured to generate a magnetic field that causes the disc element to rotate within the fluid in the housing.

14. The touch sensor of claim 10, further comprising an optical opening formed within the disc element, the optical opening configured to transmit light transmitted through the light sensing window and the reference window to the light sensor.

15. The touch sensor of claim 10, wherein the rotating disc assembly comprises an L-shaped optical opening formed therethrough, the L-shaped optical opening configured to transmit light received from the light sensing window and the reference window to the light sensor.

16. The touch sensor of claim 10, wherein in the rotating disc assembly comprises a first disc portion, a second disc portion, and a mirror disposed between the first and second disc portions.

17. The touch sensor of claim 10, wherein the rotating disc assembly comprises an L-shaped optical opening formed therethrough, the L-shaped optical opening having a first optical opening portion that enables light to be transmitted from the light sensing window and the reference window to a mirror, the mirror reflecting the light through a second optical opening portion to the light sensor.

18. A touch system comprising:
    a touch sensing plane;
    a light source configured to illuminate the touch sensing plane; and
    a touch sensor positioned proximate to the touch sensing plane, the touch sensor comprising:
        a housing having a light sensing window, a light blocking section, and a reference window, the light sensing window and the reference window configured to allow light to pass therethrough, the light blocking section configured to prohibit light from passing therethrough;
        a rotating assembly disposed within the housing; and
        a light sensor;
        wherein the disc assembly is configured to transmit light received from the light sensing window and the reference window to the light sensor, and the light sensor is configured to output a signal that is utilized to identify a location of a touch on the touch system.

19. The touch system of claim 18, further comprising a fluid disposed within the housing, the fluid enabling the rotating assembly to be suspended within the housing.

20. The touch system of claim 18, wherein the touch plane comprises a plurality of touch sensors, each touch sensor being disposed proximate to a different corner of the touch sensing plane.

* * * * *